United States Patent
Morneau et al.

(10) Patent No.: US 8,564,453 B1
(45) Date of Patent: Oct. 22, 2013

(54) INDICATING ERRORS IN CONNECTION WITH DEVICES

(75) Inventors: Todd Morneau, Sudbury, MA (US); Jon Busenkell, Hollis, NH (US)

(73) Assignee: EMC Corporation, Hopkinton, MA (US)

( * ) Notice: Subject to any disclaimer, the term of this patent is extended or adjusted under 35 U.S.C. 154(b) by 266 days.

(21) Appl. No.: 13/226,878

(22) Filed: Sep. 7, 2011

(51) Int. Cl.
*G08B 5/00* (2006.01)
*H04Q 1/30* (2006.01)
*G05B 19/00* (2006.01)

(52) U.S. Cl.
USPC ............... 340/815.4; 340/7.44; 340/5.32

(58) Field of Classification Search
None
See application file for complete search history.

(56) References Cited

U.S. PATENT DOCUMENTS

2010/0229112 A1* 9/2010 Ergan et al. .................. 715/764
2010/0306668 A1* 12/2010 Williams et al. ............. 715/741

* cited by examiner

*Primary Examiner* — Steven Lim
*Assistant Examiner* — Omeed Alizada
(74) *Attorney, Agent, or Firm* — Krishendu Gupta; Jason A. Reyes

(57) ABSTRACT

A method and system for use in indicating errors in connection with devices, wherein at least one of the devices comprises a display is disclosed. An error indicator suitable for indicating an error in connection with the device is stored. The error indicator is mapped to a potential error in connection with the device. An error is detected in connection with the device. The error in connection with the device is determined in response to detecting the error. Based on determining the error, the error indicator is displayed on the display for enabling determination of the error in connection with the device.

20 Claims, 4 Drawing Sheets

INDICATING ERRORS IN CONNECTION WITH DEVICES

TECHNICAL FIELD

The invention relates to indicating errors in connection with devices.

BACKGROUND OF THE INVENTION

Generally, security systems employ identity-based authentication schemes to verify the identity of an entity that is allowed access to a physical location or object, in the case of a physical security system, or electronic access to a computer system or data, in the case of a data security system. One goal of such security systems is to accurately determine identity so that an unauthorized party cannot gain access. Security systems can use one or more of several factors, alone or in combination, to authenticate entities. For example, identification systems can be based on something that the entity knows, something the entity is, or something that the entity has.

Examples of something an entity knows are a code word, password, personal identification number ("PIN") and the like. One exemplary computer-based authentication method involves the communication of a secret that is specific to a particular entity or user. The entity seeking authentication transmits the secret or a value derived from the secret to a verifier, which authenticates the identity of the entity. In a typical implementation, an entity communicates both identifying information (e.g., a user name) and a secret (e.g., a password) to the verifier. The verifier typically possesses records that associate a secret with each entity. If the verifier receives the appropriate secret for the entity, the entity is successfully authenticated. If the verifier does receive the correct secret, the authentication fails.

Examples of something the entity is include characteristics that are unique to people, such as physical, biological, and psychological characteristics (referred to generally here as biological characteristics), such as fingerprints, handwriting, eye retina patterns, and face, body, and organ appearance, size and shape. Suitable biological characteristics typically are not under the control of the person, and are therefore difficult for anyone besides the intended person to present, because, in part, they are difficult to replicate. The verifier typically can observe the characteristic, and compare the characteristic to records that associate the characteristic with the entity. The observation of biological characteristics is referred to generally as biometric measurement.

An example of something an entity possesses is a physical or digital device, referred to generally as a token, that is unique, or relatively unique, to the user. A simple example is a conventional metal key for use in a door. Possession of the door key in effect authenticates the user to the lock and allows entry. Similarly, possession of a token such as a bank card having certain specific physical and electronic characteristics, for example containing a specific identification number that is revealed when the token is accessed in a particular manner, can be this type of factor. A token containing a computing device that performs encryption using an encryption key contained in the device would also be regarded as this type of factor. For example, a token could accept user input, which might include a PIN or a challenge value, and provide as output a result encrypted with a secret encryption key stored in the card. The verifier can then compare the output to an expected value in order to authenticate the entity.

A token might also, or alternatively, use additional input information, such as time, or a counter, for example, such that the result changes over time but is deterministic to an entity that possesses a secret (e.g., a value known only by the token and the verifier), but not predictable by an observer who does not possess the secret. These systems generally perform some computation using a stored secret as input to generate an authentication code that is used to authenticate the entity. Some systems are time-based, in that they use a time-based dynamic variable to calculate a non-predictable authentication code that ultimately authenticates the entity. Here, "non-predictable" means that the authentication code is not predictable by a party that does not know the associated secret, the algorithm for calculating the code, or both.

As will be appreciated, the token over time can encounter errors or faults requiring the token to be sent to an IT professional to be fixed. However, the identification of the error or fault can be a difficult assignment for even the most experienced IT professionals.

SUMMARY OF THE INVENTION

A method and system for use in indicating errors in connection with devices, wherein at least one of the devices comprises a display is disclosed. An error indicator suitable for indicating an error in connection with the device is stored. The error indicator is mapped to a potential error in connection with the device. An error is detected in connection with the device. The error in connection with the device is determined in response to detecting the error. Based on determining the error, the error indicator is displayed on the display for enabling determination of the error in connection with the device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a composition of matter, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
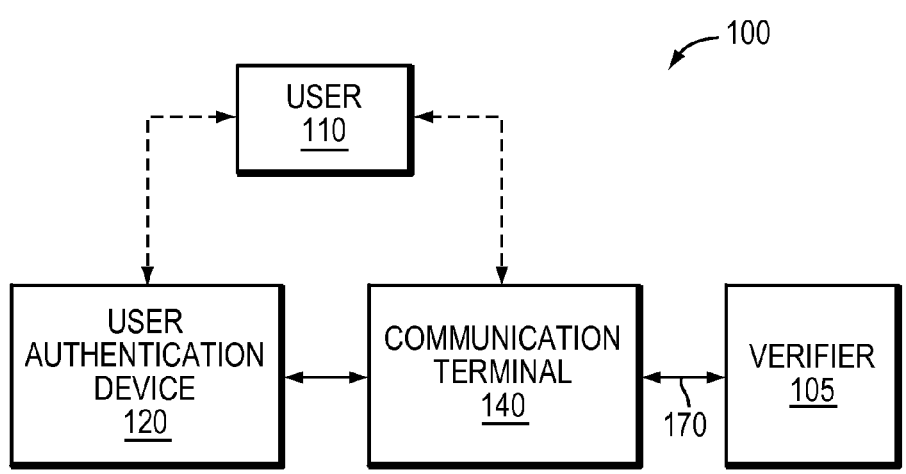
FIG. 1 is an example of a system that may utilize the technique described herein.

Referring to FIG. 1, there is illustrated an example of a system 100 for authenticating the identity of a user 110. As used herein, to authenticate means to verify the identity of a user 110, and so authenticate and verify can be used interchangeably throughout. It will be appreciated by those skilled in the art that authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services.

The system 100 comprises a verifier 105 for assisting in authenticating the user. In one embodiment, the verifier 105 may be implemented as software running on a server class computer including a processor, memory and so on, to enable authentication of a large number of users, for example, in an enterprise. The verifier 105 can also be implemented as software running on a desktop computer, laptop computer, special-purpose device or personal digital assistant (PDA). For example, the verifier 105 can be implemented as a software program running on a general-purpose computer, possibly interacting with one or more other computer programs on the same or a different computer. Some or all of the verifier 105 functionality can be implemented in hardware, for example in an Application Specific Integrated Circuit (ASIC).

As illustrated, a user 110 can communicate with a user authentication device 120. The user authentication device 120 may provide information used to authenticate the user 110. The user authentication device 120 can be implemented in packages having a wide variety of shapes and form factors. In one embodiment, the user authentication device 120 may be a token or a key fob that is, a small device with a display and battery that may be sized and shaped to fit on a key ring. In another embodiment, the user authentication device 120 may have the capacity to communicate with other devices by a USB plug. Exemplary authentication devices are members of the RSA SECURID family of authentication tokens, available from RSA, The Security Division of EMC, of Bedford, Mass. Some RSA SECURID hardware devices, for example, display a generated authentication code value to a user, who then communicates the displayed authentication code value to a computer for communication to a verifier. For example, in one embodiment, the information may be a numerical value.

In some embodiments, the user authentication device 120 stores a seed or secret that may be used to help authenticate the user 110. Typically, the seed may be information that only is available to the authentication device 120 and the verifier 105. For example, in one embodiment, the information may be a numerical value. The seed can be used to help generate an authentication code for the user 110. The user authentication device 120 can also store or access dynamic data, which, for example, can be the current time, if implemented with a running clock. The user authentication device 120 can also provide other information, or perform other calculations or combination functions. For example, in one embodiment, in addition to a seed, the device 120 may receive a personally selected secret from the user 110 (such as a PIN or password) and generate a dynamic, non-predictable authentication code value in response to the secret received from the user 110, the seed, and the current time. Here, for example, a non-predictable authentication code value may be unpredictable to anyone who does not have access to the secret received from the user 110, the stored secret, and the algorithm that generates the authentication code value. The user authentication device 120 optionally can also receive other input, such as verifier identification, and use that and/or other additional information in the generation of the authentication code value.

User 110 may optionally have one or both of direct access to a communications terminal 140 and indirect access to the communications terminal 140 via the user authentication device 120. The communications terminal 140 may be a personal computer or a personal digital assistant (PDA) or a similar device. In one example, during the authentication process the user may read a passcode from the user authentication device 120 and enter the code manually to the communications terminal 140. In another example, the user authentication device 120 may communicate with the communications terminal 140 to deliver the passcode thereto.

The communications terminal 140 may communicate information to the verifier 105 via a communications channel 170. The communications channel 170 can be any method and/or interface that enables communication of information to the verifier 105 that may be required to authenticate the identity of the user 110. The communications terminal 140 can communicate information generated by the user 110, the device 120, or both, to the verifier 105 over a communications channel 170. The communications terminal 140 and the verifier 105 can implement the communication channel 170 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 140 and verifier 105 can be established using a variety of communication protocols (e.g., TCP/IP, IPX, SPX, NetBIOS, Ethernet, RS232, and direct asynchronous connections). The verifier 105 may process the information received from the communications terminal 140. The verifier 105 can perform actions in response to authenticating the identity of the user 110. For example, the verifier 105 can grant on-line access to data or physical access to restricted areas or physical items.

The authentication code values communicated over the communications channel 170 can be implemented to be dynamic and unpredictable (to an observer without knowledge of the algorithm and/or values used to generate the authentication code values and/or access to previous user authentication attempts) for each user authentication attempt. In some embodiments, the algorithm is selected such that the authentication code is non-predictable even if the algorithm is known to the attacker. Also, the algorithm may be selected such that knowledge of a large set of previous authentication attempts for a multiplicity of users would not make an authentication code predictable to an attacker.

In some embodiments, in order to authenticate the user, the verifier 105 performs algorithmic calculations for each user authentication attempt that is substantially identical to the algorithmic calculation performed by the user authentication device 120. The verifier 105 compares the authentication information received over communications channel 170 and the authentication information generated by the verifier 105 to determine whether any match. If there is a match, then the verifier 105 can authenticate the identity of the user 110. In one embodiment, when the received and generated user information do not match, the user authentication attempt fails. In some embodiments, the verifier 105 can communicate positive or negative acknowledgement to the communications terminal 140 via the communications channel 170, and the terminal 140 may or may not communicate the acknowledgement to the device 120 or directly to the user 110.

Figure 2:
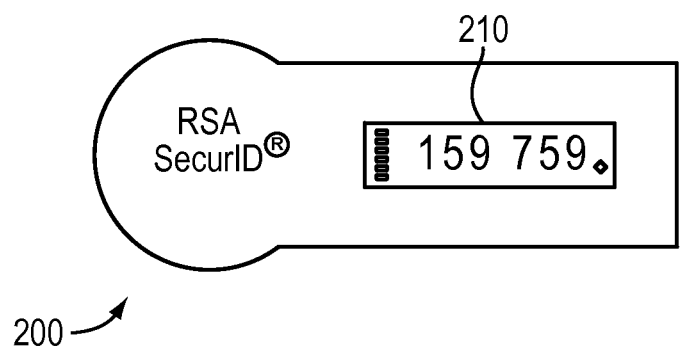
FIG. 2 is an example of a device that may utilize the technique described herein.
Figure 3:
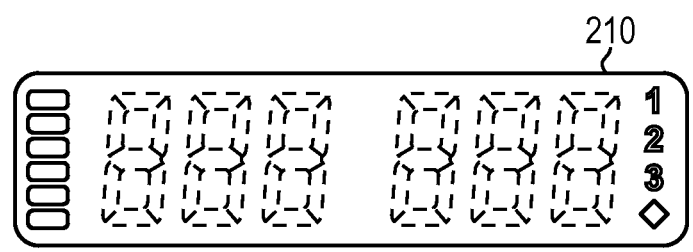
FIG. 3 is an example of a display of a device that may utilize the technique described herein.

Referring to FIGS. 2 and 3, there is illustrated an example of a user authentication device 200 suitable for issuing a passcode for authenticating a user. In one embodiment, the device is a RSA authentication token comprising a LCD display 210 for issuing a passcode to a user. The display 210 in FIG. 3 is illustrated in a non-energized non-operational state comprising six passcode numerals (888 888) that may represent a passcode. The display also comprises three peripheral numerals (1, 2, 3) and a diamond character (◇) located on the right side periphery thereof. Additionally, the display comprises countdown bars on the left side periphery thereof. The countdown bars may illustrate the time remaining before a new passcode is issued and displayed on the display. For example, a new passcode may be issued and displayed every sixty seconds and one countdown bar may disappear every ten seconds to illustrate the time remaining before a new passcode is displayed.

Conventionally, the device displays the passcode numerals centrally to allow a user to read clearly the passcode therefrom. The device in an energized operational state displays the diamond character blinking at a predetermined rate to signify that the device is functioning properly. Additionally, the device displays the peripheral numeral three in response to determining the battery life of the device is to expire shortly. For example, the numeral may be visible in response to determining that the battery life is to expire in a month. Furthermore, the device displays the countdown bars to illustrate the time remaining before a new passcode is issued and displayed as described above. Moreover, the device is configured so that the passcode, countdown bars, peripheral numerals and diamond character blink simultaneously in response to detecting an error in connection with the device. The peripheral numerals one and two located on the right side periphery of the display are typically only displayed in response to detecting an error state.

In one embodiment, the technique as described herein leverages the passcode, countdown bars, peripheral numerals and the diamond character to assist in identifying an error in connection with the device. The technique may display the passcode, countdown bars, peripheral numerals and diamond character on the display of the device for indicating an error in connection with the device. The passcode, countdown bars, peripheral numerals and the diamond character either alone or in combination act as error indicators and can be mapped to potential errors in connection with the device so that an error indicator is displayed in response to detecting and determining an error or a characteristic thereof in connection with the device for enabling the error to be readily ascertained.

In one embodiment, the technique may be configured for having the entire display blink in response to detecting an error state, but leaving one of the numerals, for example the numeral 1, blank to indicate a certain type of error has occurred. If the numeral 1 is not blinking when the rest of the display is blinking this indicates a defined error mode or condition for malfunction. The advantage of the approach is that it is unlikely an end user would notice the missing numeral or character but it would be noticed by an IT professional with access to the mapping information allowing the error to be readily identified.

In another embodiment, the technique may be configured to display numerals 2 and 3 blinking simultaneously together with the passcode numerals to indicate that the device's POST failed. The numeral 1 may not be visible in such an error state. In another embodiment, the technique may be configured to display numerals 1 and 3 blinking simultaneously together with the passcode numerals to indicate that the device's BREAK instruction executed. It will be known to those skilled in the art that unused ROM filled with the BREAK instruction indicates the program counter has accessed an invalid area. The numeral 2 may not be visible in such an error state. In another embodiment, the technique may be configured to display numerals 1 and 2 blinking simultaneously together with the passcode numerals to indicate that the devices security mesh has been subject to tampering. The numeral 3 may not be visible in such an error state. In another embodiment, the technique may be configured to display numeral 2 blinking together with the passcode numerals to indicate that the devices oscillation stop detect has been activated. The numerals 1 and 3 may not be visible in such an error state. In another embodiment, the technique may be configured so that all numerals blinking together indicates that the user should contact an IT professional.

Figure 4:
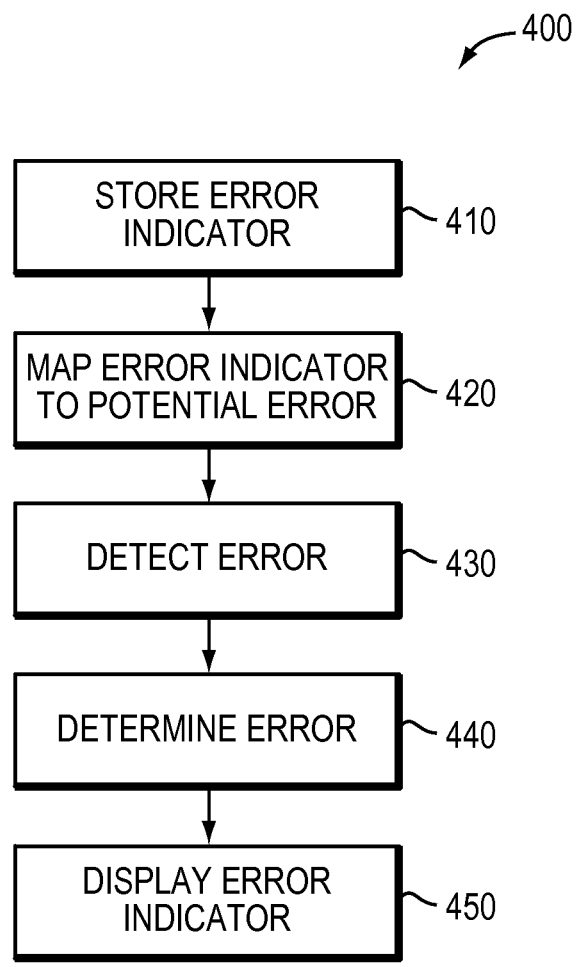
FIG. 4 is a flowchart summarizing the steps of a technique for indicating an error in connection with a device.

Referring to FIG. 4, there is shown a flowchart of processing steps of a technique for use in connection with a device. The technique illustrated generally by the reference numeral 400 is configured for use in indicating an error in connection with the device. In this embodiment, the device comprises a display. In another embodiment, the technique is suitable for use in connection with a user authentication device. The technique comprises storing 410 an error indicator suitable for indicating an error in connection with the device. In one embodiment, the technique may store a plurality of error indicators in connection with the device with each error indicator corresponding to a discrete error in connection with the device. In another embodiment the error indicator may comprise at least one discrete character corresponding to an error in connection with the device. For example, the error indicator may comprise a discrete numeral or a plurality of discrete numerals. The technique also comprises mapping 420 the error indicator to a potential error in connection with the device. For example, the potential error may be a tampering error or an electrostatic induced error. The technique also comprises detecting 430 an error in connection with the device. In one embodiment, the technique may detect a characteristic of an error indicating an error type. Furthermore, the technique comprises determining 440 the error in connection with the device in response to detecting the error. Additionally, the technique comprises displaying 450 the error indicator associated with the error on the display for enabling determination of the error based on the mapping and determining the error. In one embodiment, the error indicator displayed may blink at a predetermined rate to alert a user to the error in connection with the device.

Figure 5:
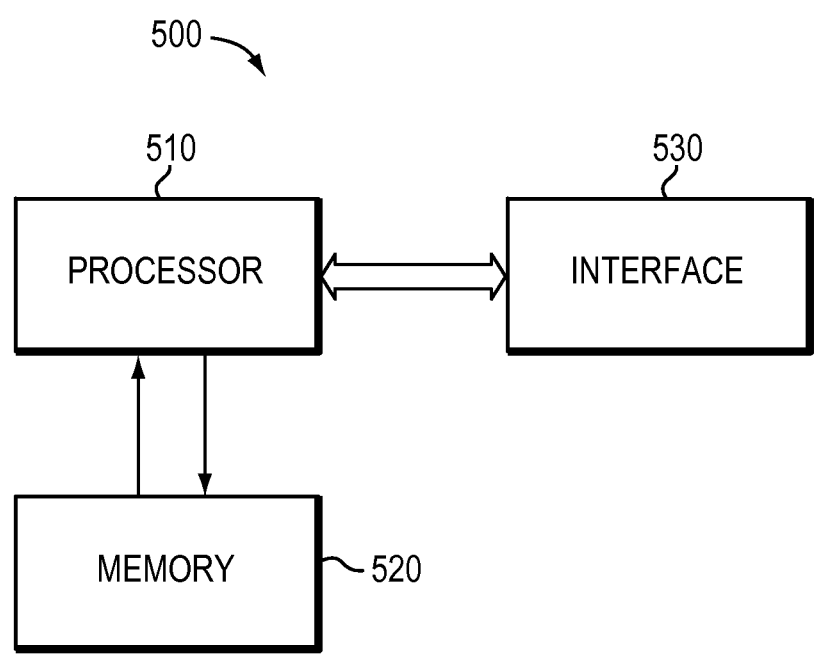
FIG. 5 is an example of a possible implementation of the technique as described herein.

Referring to FIG. 5, there is illustrated a device 500 for implementing the technique as described herein. For example, the device 500 may be a user authentication device as described above. In this implementation, the device 500 includes a processor 510 coupled to a memory 520 and an interface 530. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of the technique described herein can be implemented at least in part in the form of one or more software programs that are stored in memory 520 and executed by the corresponding processor 510. The memory 520 is also used for storing information used to perform computations or other operations associated with the disclosed technique.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in indicating an error type in connection with a one-time passcode authentication device, wherein the one-time passcode authentication device comprises a display suitable for displaying a one-time passcode that can be used to authenticate the identity of a user, the method comprising:
   storing an error indicator suitable for indicating an error type in connection with the device;
   mapping the error indicator to an error type in connection with the device;
   detecting an error type in connection with the device;
   determining the error type in connection with the device in response to detecting the error type; and
   based on the mapping and determining the error type, displaying the error indicator associated with the error type on the display for enabling determination of the error type in connection with the device.

2. The method as claimed in claim 1, wherein storing a plurality of error indicators in connection with the device.

3. The method as claimed in claim 2, wherein each error indicator corresponds to a discrete error type in connection with the device.

4. The method as claimed in claim 1, wherein the error indicator comprises at least one discrete character corresponding to an error type in connection with the device.

5. The method as claimed in claim 4, wherein the error indicator comprises a discrete numeral.

6. The method as claimed in claim 4, wherein the error indicator comprises a plurality of discrete numerals.

7. The method as claimed in claim 1, wherein the error indicator is mapped to a tampering error such that the error indicator representing the tampering error is displayed on the display in response to detecting the tampering error.

8. The method as claimed in claim 1, wherein the error indicator is mapped to an electrostatic error such that the error indicator representing the electrostatic error is displayed on the display in response to detecting the electrostatic error.

9. The method as claimed in claim 1, wherein displaying the error indicator comprises blinking the error indicator at a predetermined rate to alert a user of the device to the error type in connection with the device.

10. The method as claimed in claim 1, wherein the one-time passcode authentication device is suitable for use in authenticating a user of a computer system.

11. A system for use in indicating an error type in connection with a one-time passcode authentication device, wherein the one-time passcode authentication device comprises a display suitable for displaying a one-time passcode that can be used to authenticate the identity of a user, the system comprising:
   first logic storing an error indicator suitable for indicating an error type in connection with the device;
   second logic mapping the error indicator to an error type in connection with the device;
   third logic detecting an error type in connection with the device;
   fourth logic determining the error type in connection with the device in response to detecting the error type; and
   based on the mapping and determining the error type, fifth logic displaying the error indicator associated with the error type on the display for enabling determination of the error type in connection with the device.

12. The system as claimed in claim 11, wherein storing a plurality of error indicators in connection with the device.

13. The system as claimed in claim 12, wherein each error indicator corresponds to a discrete error type in connection with the device.

14. The system as claimed in claim 11, wherein the error indicator comprises at least one discrete character corresponding to an error type in connection with the device.

15. The system as claimed in claim 14, wherein the error indicator comprises a discrete numeral.

16. The system as claimed in claim 14, wherein the error indicator comprises a plurality of discrete numerals.

17. The system as claimed in claim 11, wherein the error indicator is mapped to a tampering error such that the error indicator representing the tampering error is displayed on the display in response to detecting the tampering error.

18. The system as claimed in claim 11, wherein the error indicator is mapped to an electrostatic error such that the error indicator representing the electrostatic error is displayed on the display in response to detecting the electrostatic error.

19. The system as claimed in claim 11, wherein displaying the error indicator comprises blinking the error indicator at a predetermined rate to alert a user of the device to the error type in connection with the device.

20. The system as claimed in claim 11, wherein the one-time passcode authentication device is suitable for use in authenticating a user of a computer system.

* * * * *